United States Patent [19]

Sherman

[11] Patent Number: 5,285,111
[45] Date of Patent: Feb. 8, 1994

[54] INTEGRATED HYBRID TRANSMISSION WITH INERTIA ASSISTED LAUNCH

[75] Inventor: James F. Sherman, Brighton, Mich.

[73] Assignee: General Motors Corporation, Detroit, Mich.

[21] Appl. No.: 54,799

[22] Filed: Apr. 27, 1993

[51] Int. Cl.⁵ .................. B60L 11/14; F16H 37/06
[52] U.S. Cl. .................. 290/4 C; 180/65.2; 290/8; 290/45; 475/276
[58] Field of Search .............. 180/65.2; 290/4 C, 8, 290/45; 475/276

[56] References Cited

U.S. PATENT DOCUMENTS

| | | | |
|---|---|---|---|
| 3,620,323 | 11/1971 | Maeda et al. | 180/65.2 |
| 5,069,656 | 12/1991 | Sherman | 475/276 |
| 5,120,282 | 6/1992 | Fjällström | 475/5 |

Primary Examiner—A. D. Pellinen
Assistant Examiner—Robert Lloyd Hoover
Attorney, Agent, or Firm—Donald F. Scherer

[57] ABSTRACT

The present invention relates to a power transmission that is interposed between the internal combustion engine and the drive ratio selection transmission of a vehicle. A motor/generator is operatively connected to the power transmission, and the power transmission selectively adds and subtracts torque provided by the motor/generator to the torque provided by the internal combustion engine. The power transmission effects the operative interconnection between both the internal combustion engine and the motor/generator to the drive ratio selection transmission. The power transmission employs compounded first and second planetary gear sets. A common gear member serves not only as the ring gear for the first planetary gear set but also as the sun gear for the second planetary gear set. The power transmission provides operating advantages not possible with prior art mechanisms, and these advantages allow the internal combustion engine to operate with desirable engine emissions.

14 Claims, 6 Drawing Sheets

INTEGRATED HYBRID TRANSMISSION WITH INERTIA ASSISTED LAUNCH

TECHNICAL FIELD

The present invention relates to vehicular transmissions. More particularly, the present invention relates to a vehicular power transmission that is capable of receiving input torque from both an electric motor and an internal combustion engine. Specifically, the present invention relates to an integrated hybrid power transmission that is operatively connected to an integral electric motor/generator that not only starts the internal combustion engine but also augments a friction starting clutch with electrically generated torque and/or electric motor inertia torque for launching movement of the vehicle.

BACKGROUND OF THE INVENTION

The present invention relates to vehicular power transmissions to coordinate the torque output of an electric motor/generator and an internal combustion engine to a drive ratio selection transmission, and especially, to planetary gear sets and the associated torque transfer devices utilized for providing the desired interaction between the internal combustion engine and the electric motor/generator to meet the economic and emission requirements of internal combustion engines to propel vehicles.

Motor/generators have heretofore been employed for launching vehicles. However, the prior art has not appreciated, and has not therefore, disclosed how an integrated motor/generator can be incorporated in the overall operation of a vehicle for maximum utility.

SUMMARY OF THE INVENTION

It is, therefore, a primary object of the present invention to provide an integrated hybrid power transmission wherein the power train provides a greater electrical generating capacity from a motor/generator than is currently available with belt-driven generators.

It is another object of the present invention to provide an integrated hybrid power transmission, as above, that utilizes the inertia available from the electric motor/generator to assist in the vehicle launch.

It is a further object of the present invention to provide an integrated hybrid power transmission, as above, that reduces the rate at which the speed of an internal combustion engine is changed during vehicle launch, unlike conventional prior art systems, wherein energy was dissipated to accelerate the internal combustion engine and all components driven thereby, to reach a power range suitable to launch the vehicle before launching could be effectively achieved.

It is still another object of the present invention to provide an integrated hybrid power transmission, as above, that permits the vehicle to be driven by either the electric motor/generator or the internal combustion engine, or by both.

It is yet another object of the present invention to provide an integrated hybrid power transmission, as above, that permits a silent engine start and no engine load in idle condition.

It is a still further object of the present invention to provide an integrated hybrid power transmission, as above, that permits the motor/generator to be used for regenerative braking.

It is an additional object of the present invention to provide an integrated hybrid power transmission, as above, that can be employed in conjunction with either automatic or manual drive ratio selection transmissions to replace the engine starter, the electric generator (or alternator), the torque converter or the standard starting clutch.

It is an even further object of the present invention to provide an integrated hybrid power transmission, as above, that can be employed to provide two torque ratios for the electric motor/generator, three torque ratios for the internal combustion engine and variable speed ratios for both.

These and other objects of the invention, as well as the advantages thereof over existing and prior art forms, which will be apparent in view of the following detailed specification, are accomplished by means hereinafter described and claimed.

In general the present invention relates to a power train for a vehicle having an internal combustion engine to provide a torque source and a drive ratio selection transmission. The power train includes a power transmission that is interposed between the internal combustion engine and the drive ratio selection transmission. A motor/generator is operatively connected to the power transmission, and the power transmission selectively adds and subtracts torque provided by the motor/generator to the torque provided by the internal combustion engine.

The interconnection provided by the power train between both the internal combustion engine and the motor/generator to the drive ratio selection transmission is accomplished by a power transmission.

The power transmission employs compounded first and second planetary gear sets. The first and second planetary gear sets each have a sun gear, a ring gear and a plurality of planetary gears. The planetary gears are mounted on respective first and second carriers operatively to connect the sun and ring gears of the respective planetary gear sets.

Although conventional compounding of the planetary gear sets may be employed, it should also be appreciated that a common gear member may serve not only as the ring gear for the first planetary gear set but also as the sun gear for the second planetary gear set. The internal combustion engine is adapted selectively to provide torque to the ring and carrier of the second planetary gear set.

Means are also provided selectively to transfer torque between the motor/generator and the sun gear of the first planetary gear set and the second carrier. Further means selectively transfer torque between the drive ratio selection transmission and the internal combustion engine, the ring gear of the second planetary gear set and the motor/generator through the second carrier.

The first carrier is selectively connected to ground, and means selectively connect the drive ratio selection transmission to ground.

The improved integrated hybrid power transmission provided by the present invention is operative to add or subtract torque from the motor/generator to torque from the internal combustion engine in order to provide the most favorable fuel economy and/or emissions control.

To acquaint persons skilled in the arts most closely related to the present invention, one preferred embodiment thereof that illustrates a best mode now contemplated for putting the invention into practice is described herein. The written description references the annexed drawings, which form a part of the specification. The exemplary integrated hybrid power transmission is described in detail without attempting to show all of the various forms and modification in which the invention might be embodied. As such, the embodiment shown and described herein is illustrative and, as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
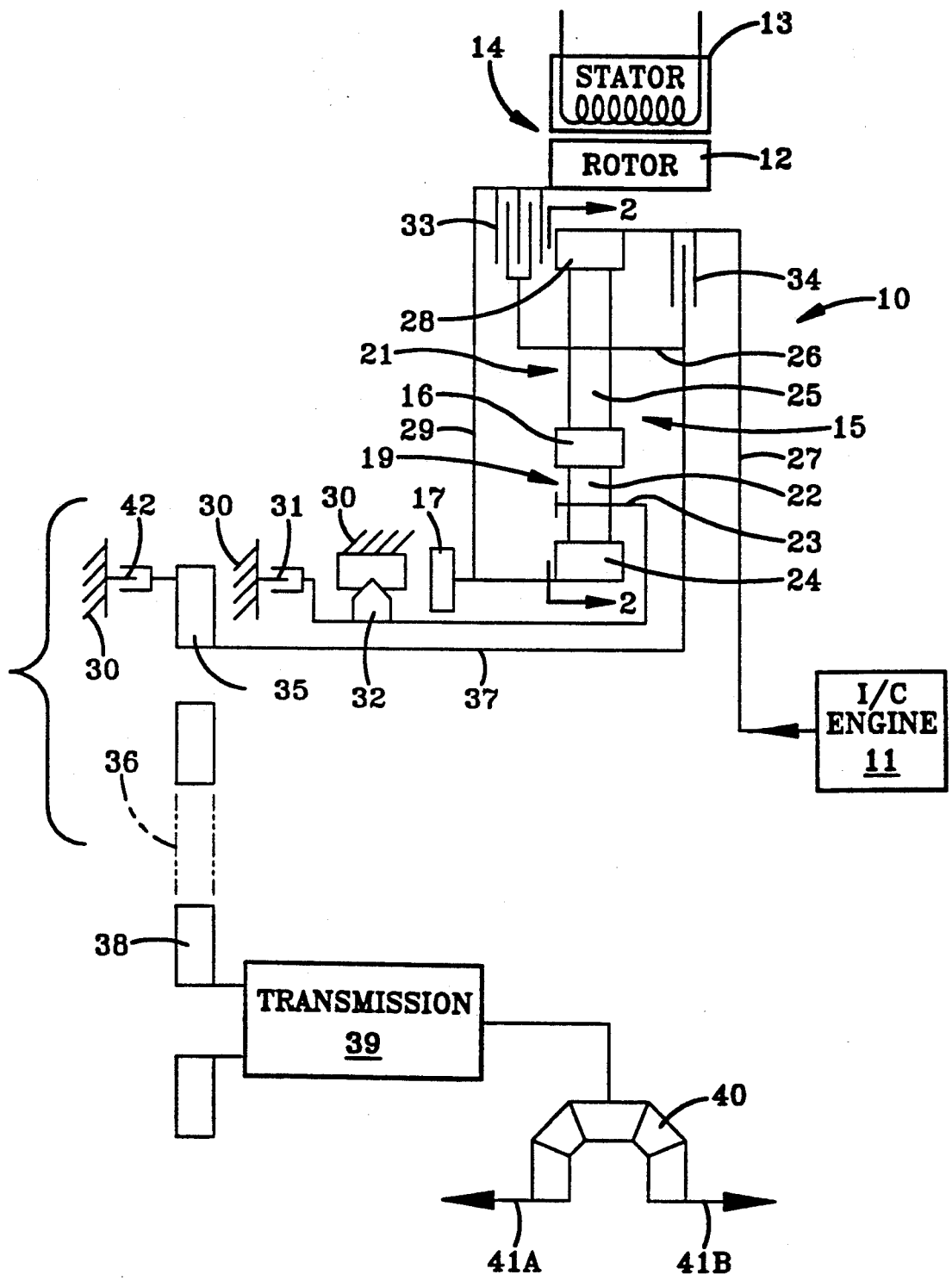
FIG. 1 is a schematic sectional representation of an integrated hybrid power transmission operatively connected to an electric motor/generator and an internal combustion engine to provide torque, through a drive ratio selection transmission, drive of a vehicle.
Figure 2:
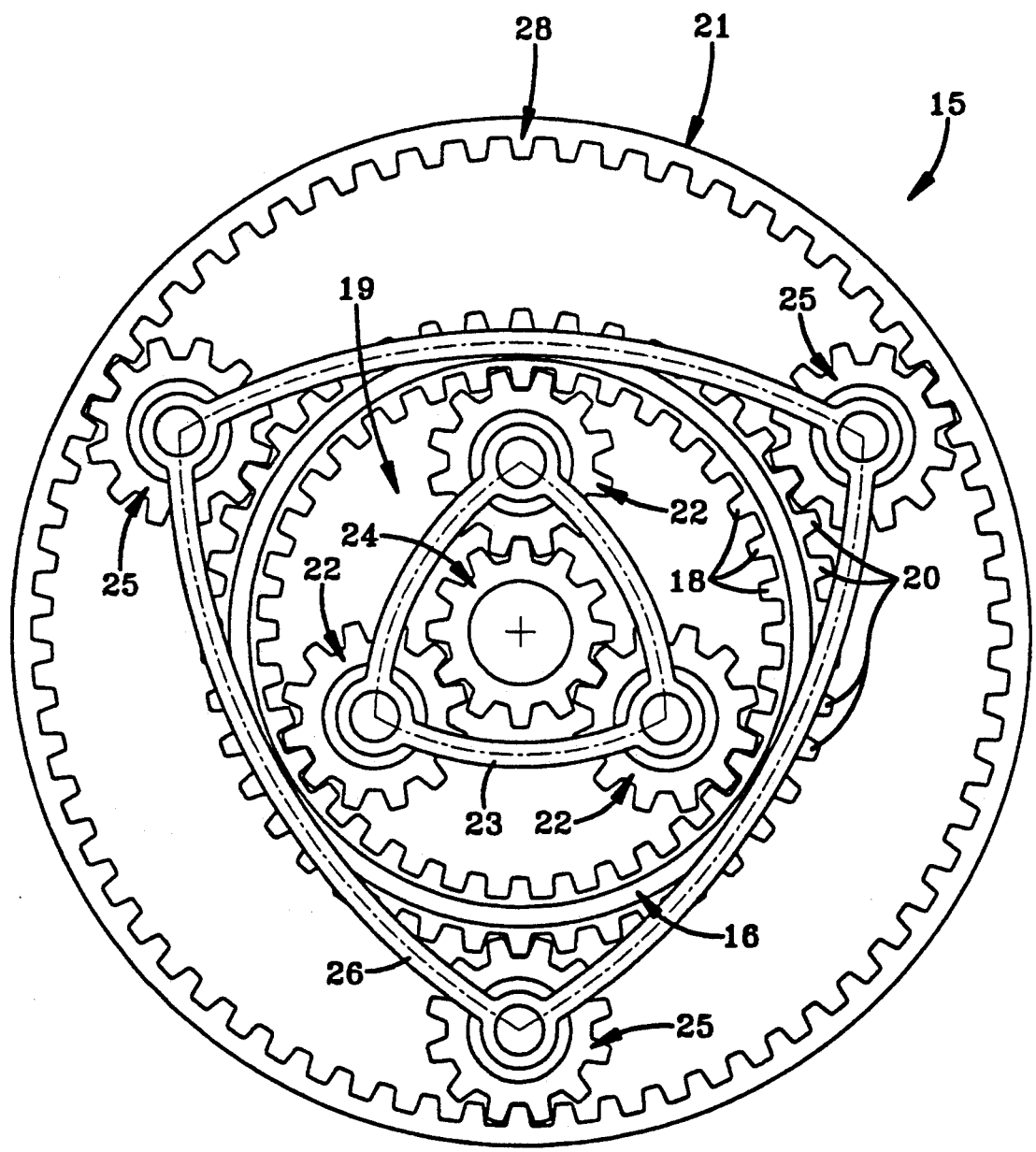
FIG. 2 is an enlarged schematic plan view of a compound planetary gear set particularly adapted for use in conjunction with an integrated hybrid power transmission embodying the concepts of the present invention—one half of that compound gear set is represented in FIG. 1, and that half is designated substantially along line 2—2 of FIG. 1, but FIG. 2 depicts the compound gear set in its entirety.

With reference to the drawings, and particularly FIG. 1, an integrated hybrid power transmission, generally identified at 10, receives input torque from an internal combustion engine, schematically identified at 11, as well as from a rotor 12 that is rotatable relative to the stator 13 of an electric motor/generator, identified generally at 14. The integrated hybrid power transmission 10 employs a compound planetary gear set that is identified generally by the numeral 15 in FIGS. 1 and 2. An oil pump 17 is customarily operated by the internal combustion engine 11 of the vehicle to provide hydraulic fluid under pressure for lubrication and also for actuation of the several hydraulic devices that are customarily employed within vehicular transmissions.

In the present arrangement, however, the pump 17 may be operated by the electric motor 14 or other driving source such as, for example, a separate electric motor, in order to provide hydraulic power even when the internal combustion engine 11 is not operating. The hydraulic devices, as well as the lubrication systems, are well known to the art and they will not, therefore, be further described herein.

The compound planetary gear set 15 utilizes a common connecting gear 16. The radially inner surface of the connecting gear 16 is provided with a plurality of teeth 18 that allow the connecting gear 16 to serve as a ring gear in one planetary gear set 19 in the compound planetary gear set 15. The connecting gear 16 is also provided with a plurality of teeth 20 that allow the connecting gear 16 to serve as a sun gear in a second planetary gear set 21 of the compound planetary gear set 15. As such, the common connecting gear 16 simultaneously serves as a sun gear and as a ring gear.

With reference to the first planetary gear set 19, the teeth 18 which allow the common connecting gear 16 to serve as a ring gear meshingly engage a plurality of pinion or planetary gears 22 that are connected by a carrier 23. The planetary gears 22 are also meshingly engaged with a sun gear 24. Thus, the sun gear 24, the planetary gears 22 mounted on the carrier 23 and the teeth 18 which serve as the ring gear portion of the common gear 16 constitute the first planetary gear set 19.

With reference to the second planetary gear set 21, the teeth 20, which allow the common connecting gear 16 to serve as sun gear in the second planetary gear set 21, meshingly engage a plurality of pinion or planetary gears 25 that are connected by a carrier 26. The planetary gears 25 are also meshingly engaged with a ring gear 28. Thus, the teeth 20 which allow the common gear 16 to serve as a sun gear, the planetary gears 25 mounted on the carrier 26 and the ring gear 28 constitute the second planetary gear set 21.

It should also be observed that the ring gear 28 on the second planetary gear set 21 is permanently connected to the internal combustion engine 11, as represented by line 27 in FIG. 1. A damper, not shown, may be added between the ring gear 28 and the engine 11 to reduce engine torque pulsations.

The sun gear 24 in the first planetary gear set 19 is permanently connected to the rotor 12 of the electric motor/generator 14, such that those two structural elements of the integrated hybrid power transmission 10 will only rotate in unison. This connection is represented by line 29 in FIG. 1.

The carrier 23 of the first planetary gear set 19 is selectively connected to ground 30 through a torque transfer device in the nature of a brake 31. A one-way clutch 32 is interposed between the carrier 23 and ground 30 in order to assure that the carrier 23 can only rotate in one direction.

The common connector gear 16 is engaged solely by the planetary gears 22 and 25 of the first and second planetary gear sets 19 and 21, respectively.

The carrier 26 in the second planetary gear set 21 is selectively connectible to the rotor 12, as through a first torque transfer device in the nature of a clutch 33. The carrier 26 is also selectively connectible to the ring gear 28 of the second planetary gear set 21 through a second torque transfer device, in the nature of a clutch 34. The carrier 26 is, in addition, permanently secured to an output sleeve shaft, represented by line 37 in the drawings.

The sleeve shaft 37 is connected to a pulley 35 which constitutes the output member by which torque is transferred—as by a chain drive 36—from the integrated hybrid power transmission 10 to an input pulley 38. The input pulley 38 is presented from a standard drive ratio selection transmission 39 that may also incorporate one or more planetary gear sets, as is well known to the art. As is also conventional, the drive ratio selection transmission 39 may be connected, as through a differential 40, to the final drive shafts or axles 41A and 41B of the vehicle, not shown, in which the integrated hybrid power transmission 10 is utilized.

Finally, the pulley 35—to which the carrier 26 of the second planetary gear set 21 in the integrated hybrid power transmission 10 is permanently secured—is itself selectively connected to ground 30 through a torque transfer device in the nature of a brake 42.

Because of the complexity of planetary gear systems—and their associated components—when incorporated in vehicular transmissions, transmission engineers and designers have developed and employ a schematic convention called "stick diagrams" to represent a "lever analysis" by which to facilitate the depiction and an understanding of how particular transmissions, even those which employ complex planetary gear sets, operate. The diagrammatic lever analysis provided by these stick diagrams are readily developed into free body diagrams, the essential tool of mechanical analysis. As such, the operation of the present integrated hybrid power transmission will now be presented with the assistance of the stick diagrams set forth in FIGS. 3 through 8.

In the lever analysis depicted in FIGS. 3 through 8 the compound planetary gear sets 19 and 21 are represented by levers bearing the same numerical identification, and the common gear 16 to those two planetary sets is represented by the rigid connecting link 16 that extends between the point 18 on lever 19 and point 20 on lever 21. This depiction, therefore, represents the common gear 16 that presents the ring gear teeth 18 for planetary set 19, as well as the sun gear teeth 20 for the planetary set 21.

The rotor 12 of the motor/generator 14 is represented as being permanently connected, as by the link 29, to the point 24 of the lever 19 (i.e.: the first planetary gear set) that represents the sun gear. The carrier is represented by point 23 on lever 19, which is connected to ground 30 not only through the one-way clutch 32 but also through the selectively operable torque transfer brake device 31.

With the second lever 21 representing the second planetary gear set, the point 28 represents the internal gear that is connected to the internal combustion engine 11 by the rigid link 27. The carrier of the second planetary gear set 21 is represented by point 26 on the lever 21. The carrier 26 is also represented as being connected to ground 30 through torque transfer brake device 42, as well as to the drive ratio selection transmission, as represented by output pulley 35.

It should also be understood that the motor/generator 14 may be controlled through the use of a system such as that described in U.S. Pat. No. 4,883,973 issued Nov. 28, 1989, to Lakey, et al. and assigned to the assignee of the present invention.

ENGINE START MODE

Figure 3:
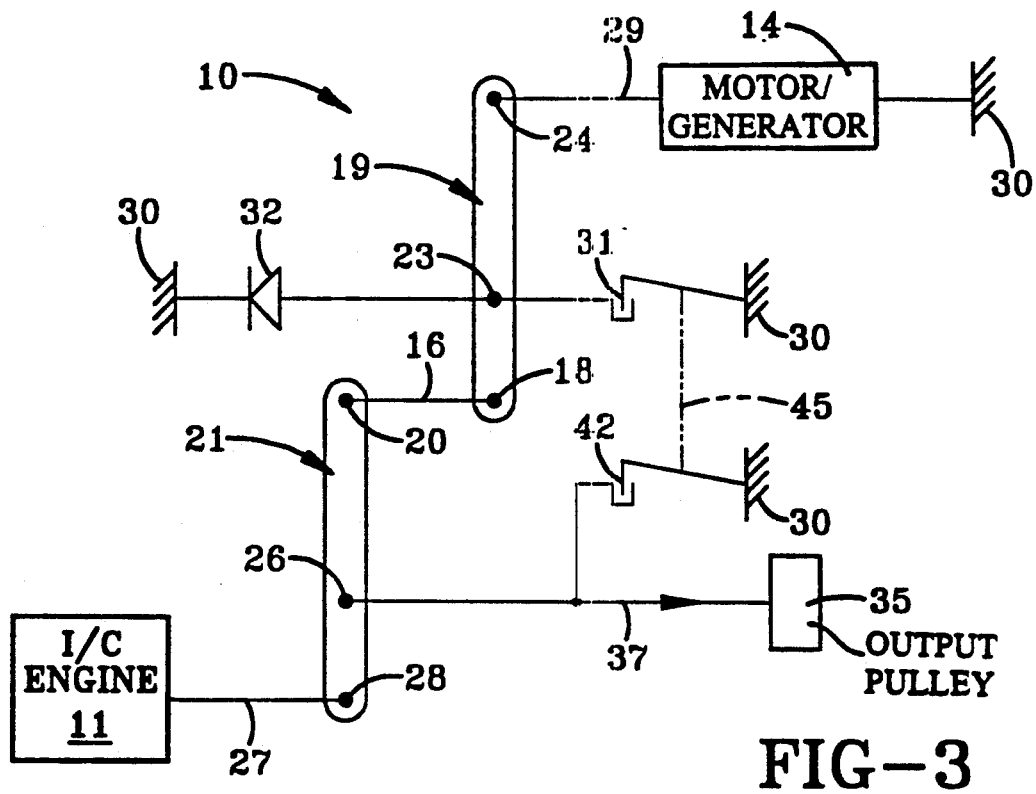
FIG. 3 is a diagrammatic representation—commonly referred to as a "Lever Analysis"—of the compound planetary gear arrangement employed in an integrated hybrid power transmission represented in FIGS. 1 and 2, and depicting the compound planetary gear arrangement of the power transmission in the Engine Start Mode.

Referring to FIG. 3, a lever analogy for the power transmission 10 is presented to depict starting the internal combustion engine 11 by the torque applied from the motor/generator 14. Both the carriers 23 and 26 are grounded through the respective torque transfer devices 31 and 42. This may be accomplished by simultaneously actuating the brakes 31 and 42 by virtue of a park lever, as represented by the dashed lines 45. By thus grounding the carriers 23 and 26, a reactive speed ratio may be established between the motor/generator and the crank shaft of the internal combustion engine 11.

The crank shaft may be schematically represented by the connecting line 27 that extends between the internal combustion engine 11 and the ring gear 28. By appropriate selection of the relative numbers of teeth on the sun and ring gears in each planetary set 19 and 21 in the compound set 15, a reactive speed ratio on the order of approximately 4:1 may be established. This ratio dictates the motor/generator torque. A silent start may be attained with this arrangement.

Figure 4:
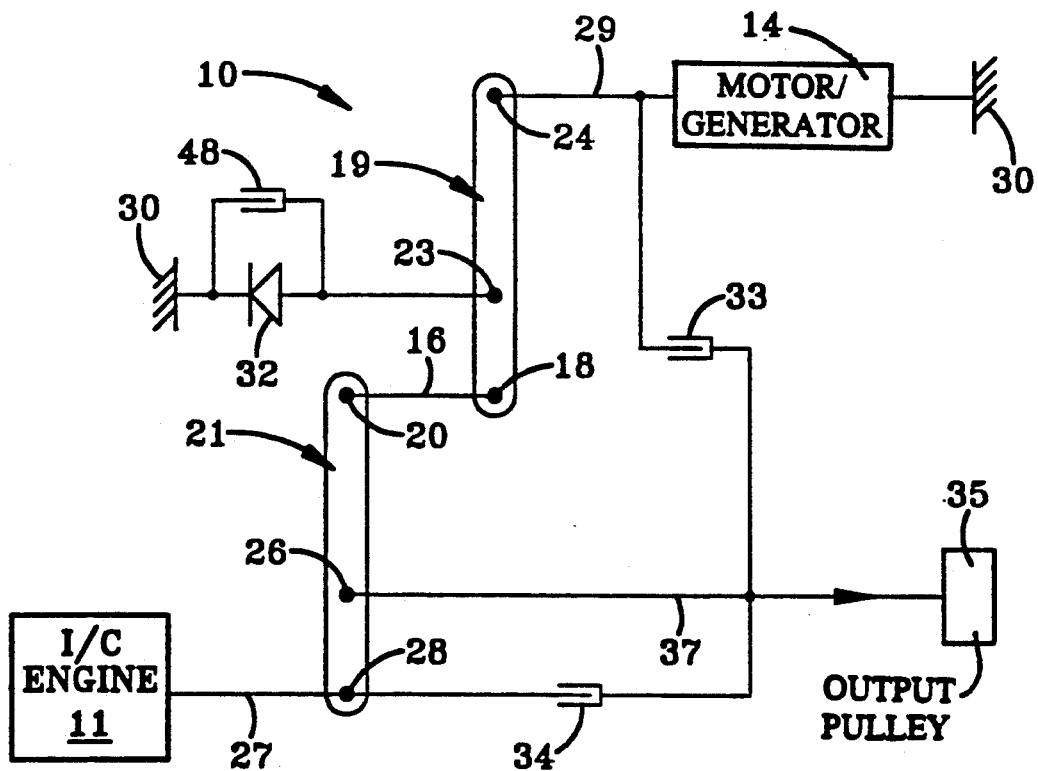
FIG. 4 is a diagrammatic representation similar to FIG. 3 depicting a lever analysis of the compound planetary gear arrangement in the power transmission in the Vehicle Launch Mode.

Obviously, the internal combustion engine can only be started in this manner when the Park or Neutral Mode of the power transmission is employed. High generator output is also available in the Park or Neutral Mode. Prevention of gear rattle and a reduction in crank shaft pulsations may also be obtained by the provision of some reactive torque by the motor/generator 14. When employing an oil pump not driven by the internal combustion engine 11, brake 48, as shown in FIG. 4, and automatic transmission brakes and clutches (torque transfer devices that ground the transmission input) may be actuated in Park or Neutral Mode for engine start. Automatic transmission operation with the hybrid transmission 10 is effected by shifting from the Park or Neutral Mode to a Drive Mode.

It should also be appreciated that the generator field is reduced for shift feel when the carriers 23 and 26 are freed from ground by manipulation of the park lever 45.

VEHICLE LAUNCHING MODE

With the engine running, and in Launching Mode, the flywheel inertia of ring gear 28 and the attached components react in both positive and negative directions with the crankshaft. The flywheel inertia of rotor 12 of motor/generator 14 and the attached components react only in the positive or forward direction through one way clutch 32, thereby requiring less energy to maintain the engine speed while reducing idle shake.

With specific reference to FIG. 4, a lever analogy for the power transmission 10 is presented to depict launching of the vehicle. Two methods of launch may be used. The first—designated as the heavy throttle inertia-assisted method—uses the motor/generator torque transfer device 33 as a starting clutch. For example, with the internal combustion engine 11 operating at 600 RPM and the rotor 12 of the motor/generator 14 revolving at 2,300 RPM—a 3.86 ratio—the accelerator is depressed. Reaction is through the one-way clutch 32 to ground 30.

The internal combustion engine 11 is operated in a manner that would effect acceleration of the vehicle. The motor/generator 14 would also be accelerated.

However, the motor/generator clutch 33 is applied to decelerate the motor/generator 14 at a controlled rate. The internal combustion engine 11 maintains its speed and the torque resulting from the inertia of the rotor 12 is added to the torque applied by the internal combustion engine 11 during initiation of the launch. As the differential speed across the motor/generator clutch 33 decreases, the torque of the motor/generator 14 is increased to maintain a controlled rate of application to synchronous speed lock up.

The second or alternative method of launching a vehicle with the power transmission 10 is designated as the light to mid-throttle generator reaction launch. The light to mid-throttle generator reaction launch is accomplished by directing the launch reaction through the one-way clutch 32 to ground 30 and by controlling the speed by the motor/generator 14 through an electric brake reaction to ground 30. With the internal combustion engine 11 operating at 600 RPM and the rotor 12 of the motor/generator 14 revolving at 2,300 RPM, the accelerator is depressed. The reaction is through the one-way clutch 32 to ground 30, and the internal combustion engine 11 is operated in a manner that would effect acceleration of the vehicle. This would normally accelerate rotation of the motor/generator 14. However, deceleration is provided by reversing the field of the stator 13, thereby causing the motor/generator 14 to act as an electric brake.

This motor/generator reaction serves to charge the battery and also controls the rate at which the vehicle is accelerated. In this way, it is possible to effect the desired acceleration with decreased throttle application in order to provide maximum economy of operation and to achieve the desired emission reduction, during the launch phase. The motor/generator clutch 33 may be applied at or near the synchronous speed and the motor/generator torque adjusted for the most desirable interaction.

It should also be appreciated that a bridging torque transfer device in the nature of a brake 48 may be added in parallel with the one-way clutch 32 to provide an alternative means by which to effect torque reversal—i.e.: to simulate electric field reversal and to effect regenerative braking—when the motor/generator clutch 33 is not applied. That is, the rotor 12 of the motor/generator 14 rotates in the same direction as the internal combustion engine 11, and at a speed three to four times greater that the speed of the internal combustion engine 11 when the vehicle is stopped. This relative speed differential provides reaction for launch of the vehicle and inertia for virtually eliminating the undesirable jerking that might otherwise be felt when the motor/generator clutch 33 is actuated.

MOTOR/GENERATOR COUPLING MODE

Figure 5:
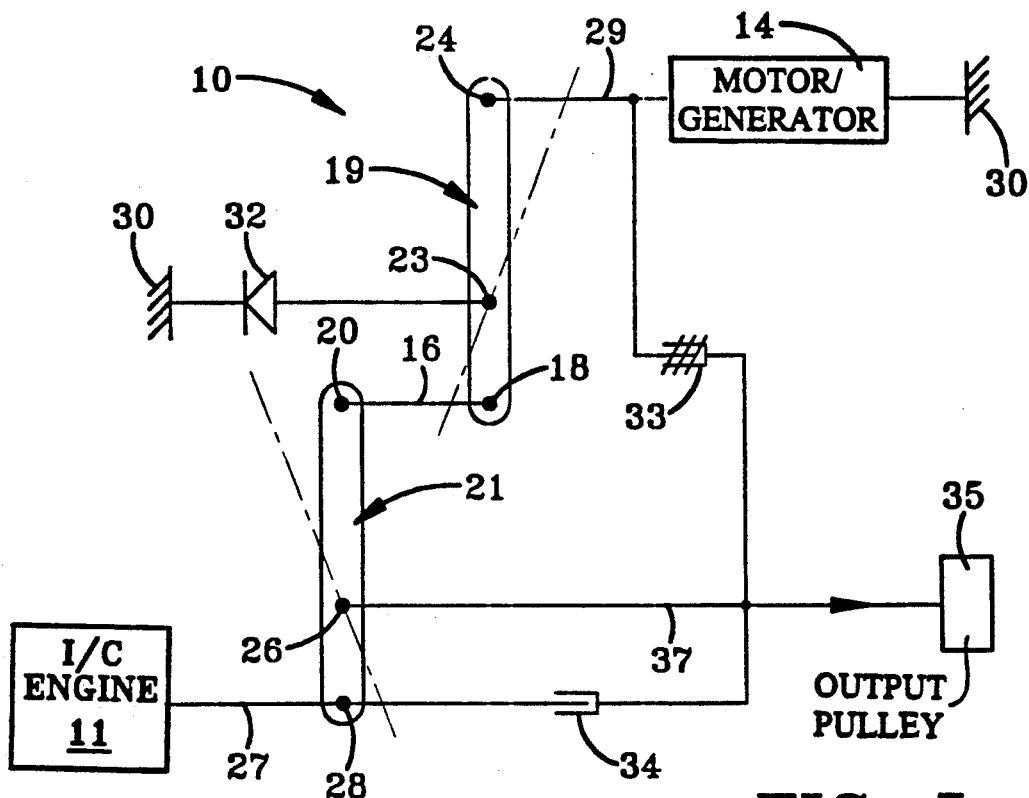
FIG. 5 is a diagrammatic representation similar to FIGS. 3 and 4 depicting a lever analysis of the compound planetary gear arrangement in the power transmission in the Motor/Generator Coupling Mode.

Referring to FIG. 5 a lever analogy for the power transmission 10 is presented to depict the motor/generator coupling phase after the motor/generator clutch 33 is engaged and the output torque ratio is increased, as for example, from 1.5:1 to 1.7586:1 times the torque supplied by the internal combustion engine 11. In this condition, the torque of the motor/generator 14 may be added or subtracted from the multiplied torque of the internal combustion engine 11. The resulting axial torque controlled by the motor/generator 14 assures the desired best performance by selectively optimizing the operation of the internal combustion engine throttle opening for best fuel economy and desirable emissions.

INTERNAL COMBUSTION ENGINE COUPLING MODE

Figure 6:
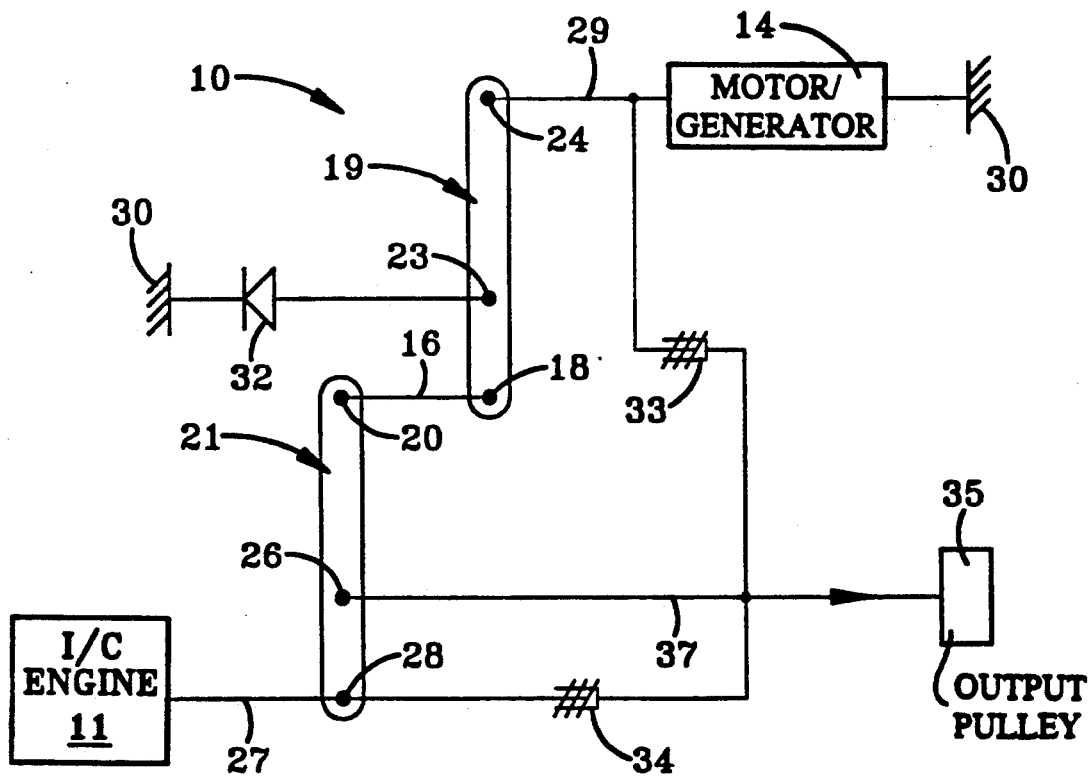
FIG. 6 is a diagrammatic representation similar to FIGS. 3-5 depicting a lever analysis of the compound planetary gear arrangement in the power transmission in the Internal Combustion Engine Coupling Mode.

Referring to FIG. 6, the lever analogy for the power transmission 10 is presented to depict the condition of the planetary mechanism 10 with the application of the engine torque transfer device (clutch) 34. The torque ratio changes from 1.786:1 to 1:1 times the engine torque. During this ratio change, and all subsequent transmission ratio changes, the motor/generator 14 may be used to bias the axial torque before, during and after the shifting or application of the engine torque clutch 34, resulting in less disturbance.

REGENERATION MODE

Figure 7:
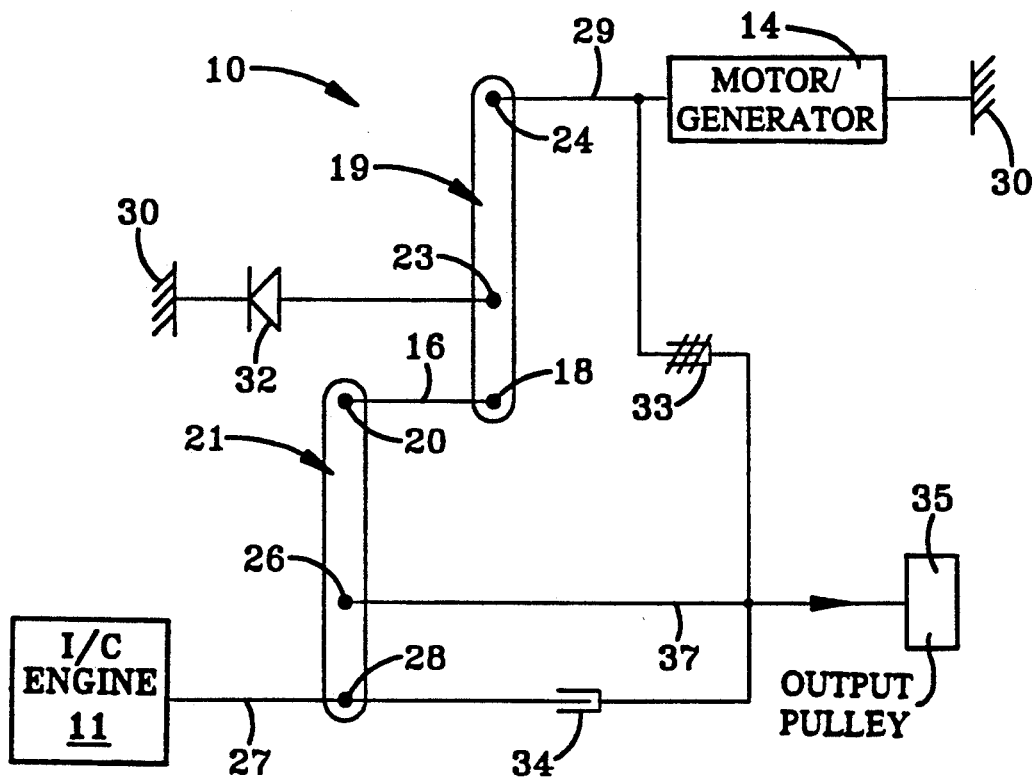
FIG. 7 is a diagrammatic representation similar to FIGS. 3-6 depicting a lever analysis of the compound planetary gear arrangement in the power transmission in the Regenerative Mode.

Referring to FIG. 7 the lever analogy for the power transmission 10 is presented to depict the regeneration mode—i.e.: that mode whereby energy may be recovered when operating with the engine torque clutch 34 disengaged during deceleration and with the motor/generator clutch 33 engaged so that the motor/generator 14 remains coupled to the output sleeve shaft 37—which remains coupled to the final drive shafts, or axles, 41—for maximum energy recovery. The speed of the internal combustion engine 11 may be reduced. However, the speed of the internal combustion engine 11 may have to be increased in order to assist the motor/generator 14 should the driver seek to accelerate the vehicle.

The present power transmission makes two torque ratios available when operating in the Regeneration Mode. For example, if the speed of the internal combustion engine 11 is increased, the one-way clutch 32 will react to ground 30 and—with the same relative number of teeth on the sun and ring gears in the compound planetary gear sets 19 and 21 as heretofore assumed—a power ratio of 1.7586:1 be automatically provided. On the other hand, if the engine clutch 34 is reapplied, a ratio of 1:1 will result.

During deceleration, the system operation is determined by driver input as well as the state of the battery charge. If a maximum charge is required, the power transmission 10 will drive the motor/generator 14 for the maximum output. If a minimum charge is required, the power transmission 10 will drive the motor/generator 14 at the optimum torque range before the system blends in the service brakes. In the event the service brake time or temperature becomes excessive, the engine clutch 34 would engage to provide engine braking.

MOTOR/GENERATOR ONLY MODE

Only limited performance is available when driving the vehicle through the power transmission 10 solely by the motor/generator 14, as represented by the lever analogy presented in FIG. 7. However, an electric oil pump (not shown) may be added to actuate the motor/generator clutch 33.

Figure 8:
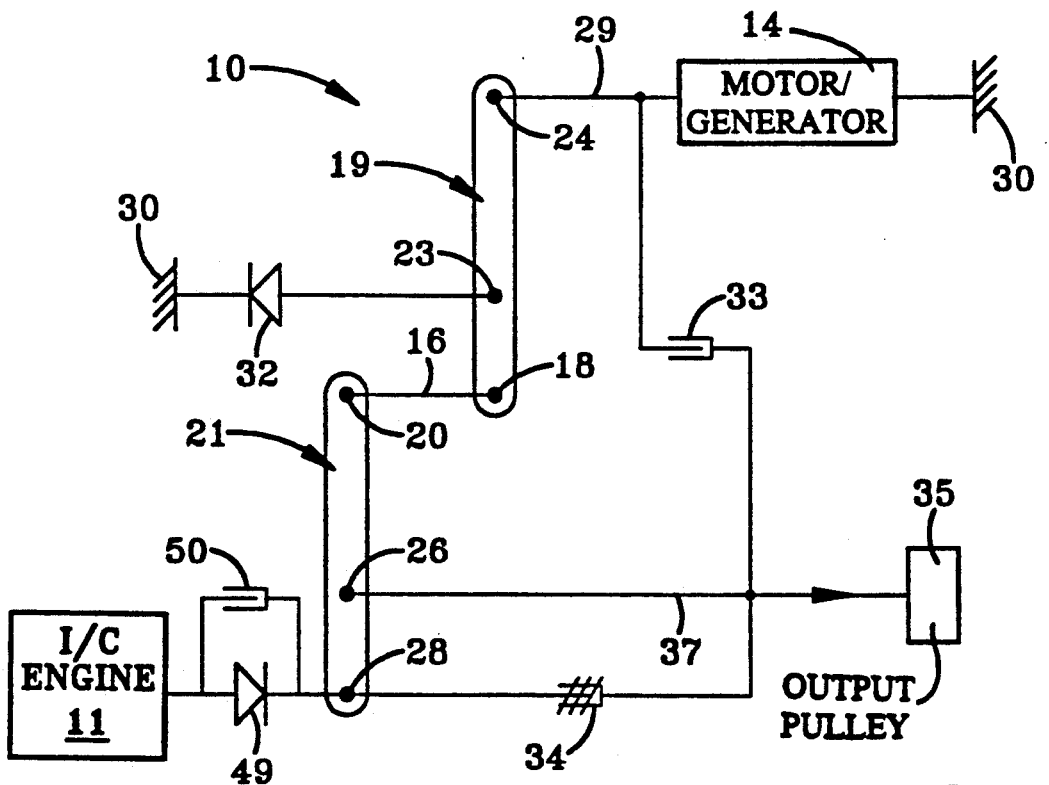
FIG. 8 is a diagrammatic representation similar to FIGS. 3-7 depicting a lever analysis of the compound planetary gear arrangement in the power transmission in the Electric Only Mode.

Alternatively, as depicted in FIG. 8, a second one-way clutch 49 may be added. When the second one-way clutch 49 is added and the engine clutch 34 is applied, the motor/generator torque is increased by 1.933, and better performance results. However, engine braking and starting is lost in this configuration unless a torque transfer device in the nature of a bridging clutch 50 is added to span across the one-way clutch 49. In this mode, the motor/generator 14 is operated in a reverse direction and a reverse gear must be provided in the drive ratio selection transmission 39 to reverse the vehicle direction.

MANUAL TRANSMISSION OPTIONS

The above-described power transmission 10 may also be used with manual ratio control systems. Starting the internal combustion engine 11 with a manual drive ratio system is the same as with an automatic drive ratio system. That is, both carrier assemblies 23 and 26 must to be grounded for reaction.

During the Motor/Generator Coupling Mode and the Internal Combustion Engine Coupling Mode, operation with a manual drive ratio selection transmission is the same as with an automatic drive ratio selection transmission. Once both the engine clutch 34 and the motor/generator clutch 33 are applied, two methods of manual shifting are available. With the first method, both the engine clutch 34 and the motor/generator clutch 33 are switched over to manual clutch pedal control, and gear synchronization may be achieved with synchronizers well known to those skilled in the art.

Alternatively, the engine clutch 34 may be switched over to pedal control. When the engine clutch 34 is pedal actuated and the motor/generator clutch 33 is engaged, the motor/generator 14 provides precise control over the speed of the power transmission 10 output sleeve shaft 37. However, when the shift lever of the manual drive ratio selection transmission is moved into the next drive select gate, the motor/generator 14 is regulated to provide the synchronous speed necessary for the drive ratio selected. By eliminating the transmission synchronizers the cost of the input differential may be offset.

Another alternative manual transmission method during launch includes providing sequential manual control of first, the motor/generator clutch 33 and sequentially thereafter the engine clutch 34.

Using the power transmission 10 in the Regeneration Mode may be accomplished with a manual drive ratio selection transmission in the same manner as previously described herein for the automatic drive ratio selection transmission. Operation in the Motor/Generator Only Mode with the manual drive ratio selection transmission may be provided during launch from a stopped condition with the motor/generator 14, but with the motor/generator clutch 33 applied.

Alternatively, the motor/generator 14 may be rotated with the motor/generator clutch 33 manually applied to utilize the torque supplied by the inertia of the rotor 12 in the motor/generator 14 and any associated flywheel. Releasing the motor/generator clutch 33 may be necessary for changing gears, if total synchronization is not possible. Also, a reverse transmission gear would be required to reverse the vehicle.

It should be understood that in normal cruising operation, the internal combustion engine 11 is the prime power source and the motor/generator 14 provides additional power for vehicle demands, such as passing without gear change and going up hill. The motor/generator 14 also is controlled for providing the desired battery charge by recovering power as the vehicle is going down hill and/or decelerating. Controls may also be utilized to manipulate the internal combustion engine throttle for best fuel economy and improved engine emissions.

ELECTRIC REVERSE OPERATION

Figure 9:
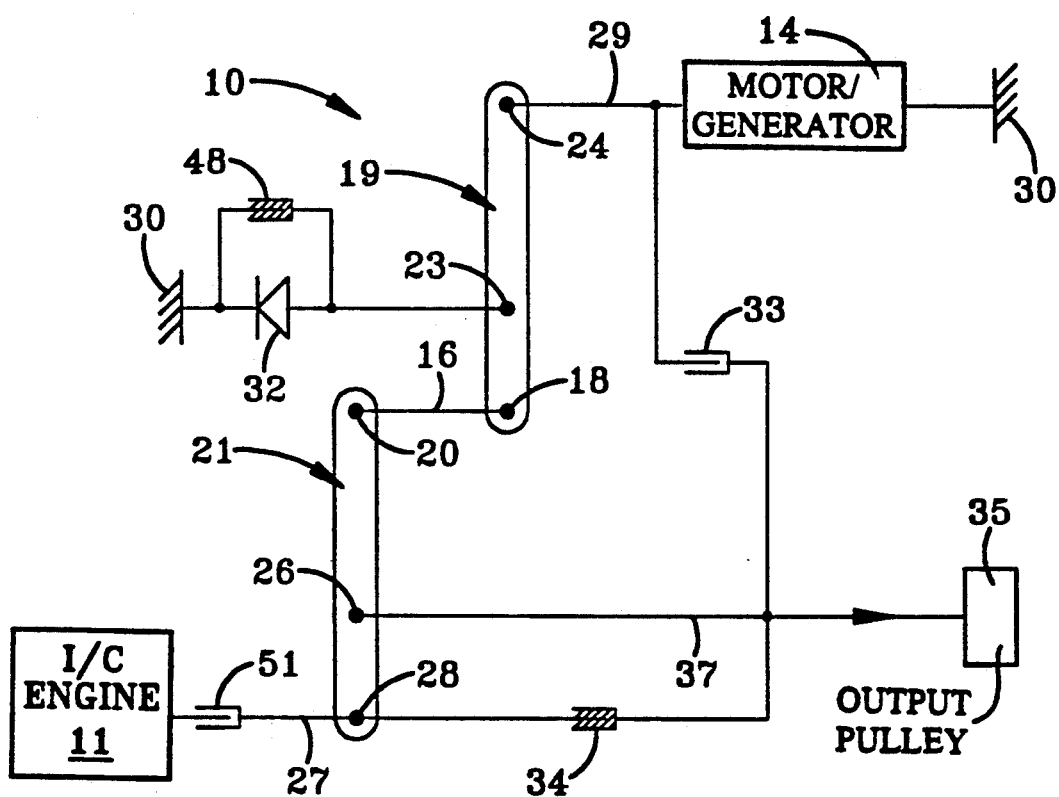
FIG. 9 is a diagrammatic representation similar to FIGS. 3-8 depicting a lever analysis of the compound planetary gear arrangement in the Reverse Mode.

With reference to FIG. 9, it can be observed that a bridging torque transfer device in the nature of a clutch 51 provides a means for effecting complete disconnection of the internal combustion engine 11 from the transmission 10. Reverse drive operation is provided by engaging both clutch 34 and brake 48 and selecting a forward ratio, preferably first gear, in the transmission. Thus, if the engine 11 becomes inoperable, the vehicle can be moved by utilizing the motor/generator 14.

CONCLUSION

From the foregoing description, it should be readily apparent to those skilled in the art that a power train for automotive vehicles is provided utilizing an electric motor/generator, planetary gear sets and clutches which can be controlled for optimum start, launch, acceleration and deceleration conditions with automatic and manual drive ratio selection transmissions.

The embodiments of the invention in which an exclusive property or privilege is claimed are defined as follows:

1. A power train for a vehicle having an internal combustion engine to provide a torque source and a drive ratio selection transmission, said power train comprising:
   a power transmission interposed between the internal combustion engine and the drive ratio selection transmission;
   a motor/generator operatively connected to said power transmission; and,
   said power transmission selectively adding and subtracting torque provided by said motor/generator to the torque provided by the internal combustion engine.

2. A power train, as set forth in claim 1, further comprising:
   means to drive said motor/generator by the vehicle inertia through the drive ratio selection transmission to recover energy and assist in braking.

3. A power train, as set forth in claim 1, further comprising:
   selectively engageable torque transmitting means to disconnect said internal combustion engine from said power transmission and to connect said motor/generator in reverse input drive relation with said power transmission.

4. A power transmission for a vehicle having an internal combustion engine, a motor/generator and a drive ratio selection transmission, said power transmission comprising:
   compounded first and second planetary gear sets, each having sun gear means, ring gear means and a plurality of planetary gears mounted on first and second carriers operatively to connect said sun and ring gear means of the respective first and second planetary gear sets;
   a common gear member serving not only as the ring gear for said first planetary gear set but also as the sun gear for said second planetary gear set;
   the internal combustion engine adapted selectively to provide torque to the ring and carrier of said second planetary gear set;
   means selectively to transfer torque between the motor/generator and said sun gear of said first planetary gear set and said second carrier;

means selectively to transfer torque to and from the drive ratio selection transmission and the internal combustion engine, said ring gear of the second planetary gear set and the motor/generator through said second carrier;

said first carrier being selectively connected to ground; and means selectively connecting said drive ratio selection transmission to ground.

5. A power transmission, as set forth in claim 4, further comprising:

a torque transfer clutch device selectively to connect said second carrier to said motor/generator.

6. A power transmission, as set forth in claim 5, further comprising:

a torque transfer clutch device to effect selective connection between said second carrier and said ring gear of said second planetary gear set.

7. A power transmission, as set forth in claim 6, further comprising:

a torque transfer brake device selectively to connect said first carrier to ground; and, a torque transfer brake device selectively to connect said second carrier to ground.

8. A power transmission, as set forth in claim 7, further comprising:

means to effect simultaneous actuation of the torque transfer brake devices that selectively connect said first and second carriers to ground.

9. A power transmission, as set forth in claim 7, further comprising:

a selectable one-way clutch interposed between said first carrier and ground for effecting utilization of the positive flywheel inertia.

10. A power transmission, as set forth in claim 9, further comprising:

a torque transfer brake device spanning said one-way clutch selectively to connect said first carrier to ground.

11. A power transmission, as set forth in claim 6, further comprising:

a second one-way clutch interposed between said ring gear of said second planetary gear set and said internal combustion engine.

12. A power transmission, as set forth in claim 11, further comprising:

a torque transfer clutch device spanning said second one-way clutch selectively to connect said ring gear of said second planetary gear set to said internal combustion engine.

13. A power transmission for a vehicle having an internal combustion engine, a motor/generator and a drive ratio selection transmission, said power transmission comprising:

interconnected first and second planetary gear sets each having sun gear means, ring gear means and a plurality of planetary gears mounted on first and second carriers operatively to connect said ring and sun gear means of the respective first and second planetary gear sets;

the ring gear for said first planetary gear set directly connected with the sun gear for said second planetary gear set;

the internal combustion engine adapted selectively to provide torque to the ring and carrier of said second planetary gear set;

means selectively to transfer torque between the motor/generator and said sun gear of said first planetary gear set and said second carrier;

means selectively to transfer torque to and from the drive ratio selection transmission and the internal combustion engine, said ring gear of the second planetary gear set and the motor/generator through said second carrier;

said first carrier being selectively connected to ground; and, means selectively connecting said drive ratio selection transmission to ground.

14. A power transmission for a vehicle having an internal combustion engine, a motor/generator and a drive ratio selection transmission, said power transmission comprising:

compounded first and second planetary gear sets, each having first gear means, second gear means and a plurality of planetary gears mounted on first and second carriers operatively to connect said first and second gear means of the respective first and second planetary gear sets;

a common gear member serving not only as the second gear for said first planetary gear set but also as the first gear for said second planetary gear set;

the internal combustion engine adapted selectively to provide torque to one gear means carrier of said second planetary gear set;

means selectively to transfer torque between the motor/generator and said one gear means of said first planetary gear set and said second carrier;

means selectively to transfer torque to and from the drive ratio selection transmission and the internal combustion engine, said one gear means of the second planetary gear set and the motor/generator through said second carrier;

said first carrier being selectively connected to ground; and, means selectively connecting said drive ratio selection transmission to ground.

* * * * *